(12) United States Patent
Washisu

(10) Patent No.: US 7,634,178 B2
(45) Date of Patent: Dec. 15, 2009

(54) IMAGE STABILIZING APPARATUS AND IMAGE PICKUP APPARATUS

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 500 days.

(21) Appl. No.: 11/612,822

(22) Filed: Dec. 19, 2006

(65) Prior Publication Data

US 2007/0147813 A1    Jun. 28, 2007

(30) Foreign Application Priority Data

Dec. 26, 2005    (JP)    ............................. 2005-372267

(51) Int. Cl.
    *G03B 17/00*    (2006.01)
    *H04N 5/228*    (2006.01)

(52) U.S. Cl. ........................ 396/53; 396/55; 348/208.1; 348/208.2; 348/208.12

(58) Field of Classification Search .............. 396/52–55
See application file for complete search history.

(56) References Cited

U.S. PATENT DOCUMENTS

| | | | |
|---|---|---|---|
| 4,869,108 A | 9/1989 | Washisu ...................... | 73/517 |
| 4,965,619 A | 10/1990 | Shikaumi et al. ............ | 354/410 |
| 5,020,369 A | 6/1991 | Washisu et al. .............. | 73/517 |
| 5,101,230 A | 3/1992 | Shikaumi et al. ............ | 354/430 |
| 5,587,558 A | 12/1996 | Matsushima ................. | 178/18 |
| 5,608,703 A | 3/1997 | Washisu ...................... | 369/55 |
| 5,649,237 A | 7/1997 | Okazaki ...................... | 396/55 |
| 5,734,932 A * | 3/1998 | Washisu ...................... | 396/55 |
| 5,774,266 A | 6/1998 | Otani et al. .................. | 359/554 |
| 5,826,115 A | 10/1998 | Washisu et al. .............. | 396/55 |
| 5,835,799 A | 11/1998 | Washisu ...................... | 396/55 |
| 5,940,630 A | 8/1999 | Washisu ...................... | 396/55 |
| 5,974,269 A | 10/1999 | Sato et al. .................... | 396/55 |
| 6,035,131 A | 3/2000 | Washisu ...................... | 396/55 |
| 6,035,132 A | 3/2000 | Washisu et al. .............. | 396/55 |
| 6,047,133 A | 4/2000 | Washisu et al. .............. | 396/55 |
| 6,122,447 A | 9/2000 | Washisu ...................... | 396/55 |
| 6,163,651 A | 12/2000 | Washisu et al. .............. | 396/55 |

(Continued)

FOREIGN PATENT DOCUMENTS

JP        7-225405       8/1995

(Continued)

OTHER PUBLICATIONS

Search Report for European Patent Application No. 06127062.5 issued Apr. 25, 2007.

*Primary Examiner*—Melissa J Koval
(74) *Attorney, Agent, or Firm*—Fitzpatrick, Cella, Harper & Scinto

(57) ABSTRACT

An image stabilizing apparatus and an image pickup apparatus that can detect shift shake reliably with a simple configuration and make highly accurate image blur correction possible even at very short subject distances. The apparatus has an angular velocity detector for detecting the angular velocity generated by shaking of the apparatus, an acceleration detector for detecting acceleration generated by the shaking, tor for calculating a correction value from the angular velocity, an acceleration corrector for correcting the acceleration based on the shake correction value, and a blur corrector for correcting image blur by decentering an optical axis based on an output of the acceleration corrector and an output of the calculator.

8 Claims, 10 Drawing Sheets

U.S. PATENT DOCUMENTS

| | | | |
|---|---|---|---|
| 6,263,161 B1 | 7/2001 | Washisu | 396/50 |
| 6,272,289 B1 | 8/2001 | Washisu | 396/55 |
| 6,393,215 B1 | 5/2002 | Washisu | 396/52 |
| 6,704,501 B1 | 3/2004 | Washisu | 396/55 |
| 6,738,198 B2 | 5/2004 | Kashiwaba et al. | 359/704 |
| 2004/0239775 A1 | 12/2004 | Washisu | 348/239 |
| 2006/0098967 A1 | 5/2006 | Togawa | 396/55 |
| 2008/0069552 A1* | 3/2008 | Washisu | 396/55 |

FOREIGN PATENT DOCUMENTS

WO    WO 2004/109386 A    12/2004

* cited by examiner

IMAGE STABILIZING APPARATUS AND IMAGE PICKUP APPARATUS

BACKGROUND OF THE INVENTION

1. Field of the Invention

The present invention relates to an image stabilizing apparatus having blur correction means for correcting image blur caused by hand shake or other reasons and to an image pickup apparatus equipped with such an image stabilizing apparatus.

2. Description of the Related Art

In current cameras, many operations, such as the determination of exposure and focusing, that are important in photographing, are automated, and the possibility of failure in photographing with such cameras is low, even if the photographer is not skilled in the handling of cameras. In addition, systems for preventing influences of hand shake on a camera have been developed. Thus, factors that can lead to failure in photographing have been being reduced.

In the following, a system for preventing the influences of shake will be described briefly.

Camera shake caused by hand movement at the time of photographing is typically a vibration of a frequency of 1 to 10 Hz. A basic method of making it possible to obtain a photograph free from image blur even when the aforementioned camera shake occurs at the time of shutter release is to detect the vibration of the camera caused by hand movement and to shift a blur correction lens in accordance with the detected value. Therefore, to make it possible to take a photograph free from image blur even when camera shake occurs, it is necessary first to detect vibration of the camera and secondly to correct changes in the optical axis caused by the camera shake.

The detection of the aforementioned vibration (or camera shake) is made possible, in principle, by equipping the camera with vibration detection means for detecting acceleration, angular acceleration, angular velocity and angular displacement etc., and appropriately processing these detection outputs for the purpose of camera shake correction. In addition, blur correction means for decentering the photographing optical axis based on detected information is driven to reduce image blur.

FIG. 10A is a plan view of a single lens reflex camera, and FIG. 10B is a side view of the same.

The image stabilizing system built in an interchangeable lens 80 mounted on this single lens reflex camera is adapted to perform image blur correction with respect to vertical camera shake and horizontal camera shake that are respectively indicated by arrows 82$p$ and 82$y$ relative to the optical axis 81. On or in a camera body 83 are provided a shutter release member 83$a$, a mode dial 83$b$ (which also functions as a main switch), a retractable flash 83$c$ and a camera CPU 83$d$.

In FIGS. 10A and 10B are also shown an image pickup element 84 and a blur correction mechanism 85 that drives a correction lens 86 in the directions indicated by arrows 85$p$ and 85$y$ in FIGS. 10A and 10B, respectively, to perform image blur correction with respect to the directions indicated by arrows 82$p$ and 82$y$. The camera is equipped with angular velocity sensors 86$p$ and 86$y$ that detect movement in the directions indicated by arrows 82$p$ and 82$y$ respectively. Arrows 86$pa$ and 86$ya$ respectively indicate the directions in which the angular velocity sensors 86$p$ and 86$y$ are sensitive. The outputs of the angular velocity sensors 86$p$ and 86$y$ are subjected to computation in a lens CPU 87 so as to be converted into blur correction values for the blur correction mechanism 85.

In synchronization with half-depression of the shutter release member 83$a$ provided on the camera body 83 (which operation triggers photometry and focusing in preparation for shooting), the blur correction values are input to coils in the blur correction mechanism 85 through a driver 88. Thus, image blur correction is started.

In the image stabilizing system described in the foregoing with reference to FIGS. 10A and 10B, use is made of the angular velocity sensors 86$p$, 86$y$ in shake detection. The camera body 83 is subject not only to rotational shake indicated by arrows 82$p$ and 82$y$ but also to translational shake indicated by arrows 11$pb$ and 11$yb$. However, in common shooting conditions, rotational shake indicated by arrows 82$p$ and 82$y$ is dominant, and image deterioration caused by translational shake indicated by arrows 11$pb$ and 11$yb$ is not significant. Therefore, to detect camera shake, it is sufficient to provide only the angular velocity sensors 86$p$ and 86$y$.

However, at very short shooting distances (i.e., in photographing conditions in which the photographing magnification is high), image deterioration caused by translational shake (which will be hereinafter referred to as shift shake) indicated by arrows 11$pb$ and 11$yb$ is not negligible. For instance, in the case of macro shooting in which subjects at distances of as short as around 20 centimeters are shot, or in the case where the focal length of the photographing optical system is very long (e.g., 400 mm) even though the subject distance is around 1 meter, it is necessary to positively detect shift shake to drive the image stabilizing apparatus.

Japanese Patent Application Laid-Open No. H07-225405 discloses a technology in which an acceleration sensor for detecting acceleration is provided to detect shift shake, and an image stabilizing apparatus is driven based on the output of the acceleration sensor in addition to the output of an angular velocity sensor that is provided separately.

In the case where an acceleration sensor is used, it is necessary to make correction with respect to the force of gravity acting thereon. The gravity correction leads to an increase in the amount of computation, and the apparatus is difficult to handle since it is necessary to always stabilize the computation output. For these reasons, this system is not suitable for use in consumer products.

SUMMARY OF THE INVENTION

The present invention has been made in view of the above described problems and has as an object to provide an image stabilizing apparatus and an image pickup apparatus that can detect shift shake reliably with a simple configuration and perform highly accurate image blur correction even at very short subject distances.

According to one aspect of the present invention, there is provided an image stabilizing apparatus comprising angular velocity detection means for detecting an angular velocity generated by shake of the image stabilizing apparatus, acceleration detection means for detecting acceleration generated by the shake, calculation means for calculating a blur correction value from the angular velocity detected by the angular velocity detection means, acceleration correction means for correcting the acceleration detected by the acceleration detection means based on the blur correction value, and blur correction means for correcting image blur by decentering an optical axis based on an output of the acceleration correcting means and an output of the calculation means.

According to another aspect of the present invention, there is provided an image stabilizing apparatus comprising angular velocity detection means for detecting an angular velocity generated by shake of the image stabilizing apparatus, acceleration detection means for detecting acceleration generated by the shake, angular velocity integration means for calculating a shake angle by integrating an output of the angular velocity detection means, gravity influence calculation means for calculating a change in the direction of the influence of gravity on the acceleration detecting means based on an output of the angular velocity integration means, acceleration correction means for correcting an output of the acceleration detection means based on an output of the gravitation influence calculation means, acceleration integration means for integrating an output of the acceleration correction means; and blur correction means for correcting image blur by decentering an optical axis based on an output of the acceleration integration means and an output of the angular velocity integration means.

According to yet another aspect of the present invention, there is provided an image stabilizing apparatus comprising angular velocity detection means for detecting an angular velocity generated by shake of the image stabilizing apparatus, acceleration detection means for detecting acceleration generated by the shake, angular velocity integration means for calculating a shake angle by integrating an output of the angular velocity detection means, acceleration integration means for integrating an acceleration output detected by the acceleration detection means, gravity influence calculation means for calculating a change in the direction of the influence of gravity on the acceleration detection means based on an output of the angular velocity integration means, acceleration correction means for correcting an output of the acceleration integration means based on an output of the gravitation influence calculation means, and blur correction means for correcting image blur by decentering an optical axis based on an output of the acceleration correction means and an output of the angular velocity integration means.

An image pickup apparatus according to still another aspect of the present invention is provided with the image stabilizing apparatus as described above.

Further features of the present invention will become apparent from the following description of exemplary embodiments with reference to the attached drawings.

DESCRIPTION OF THE EMBODIMENTS

Preferred embodiments of the present invention will be described in detail with reference to the accompanying drawings.

First Embodiment

Figure 1A:
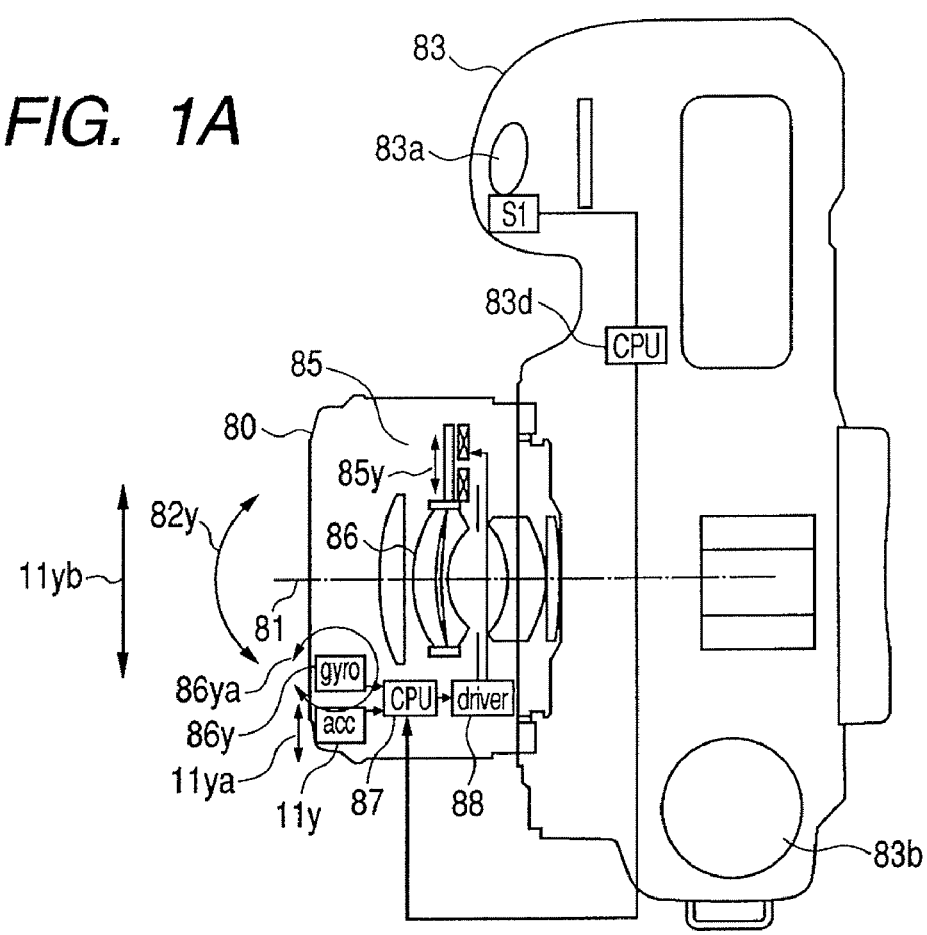
FIG. 1A is a top view of a single lens reflex camera according to a first embodiment of the present invention.
Figure 1B:
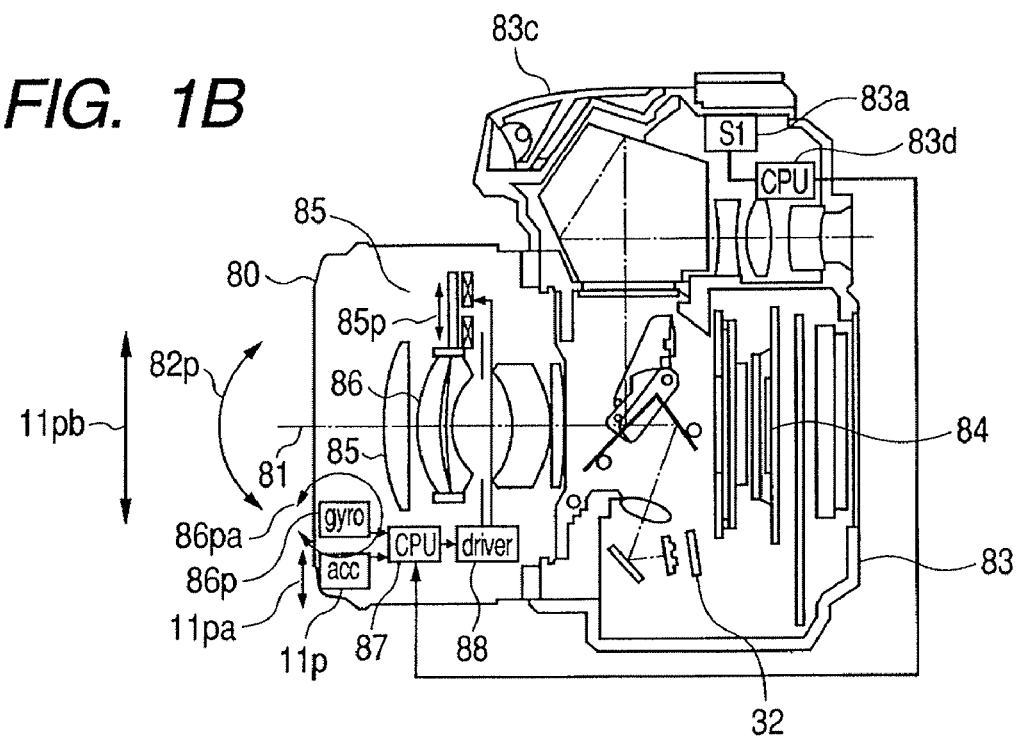
FIG. 1B is a side view of the single lens reflex camera according to the first embodiment of the present invention.
Figure 10A:
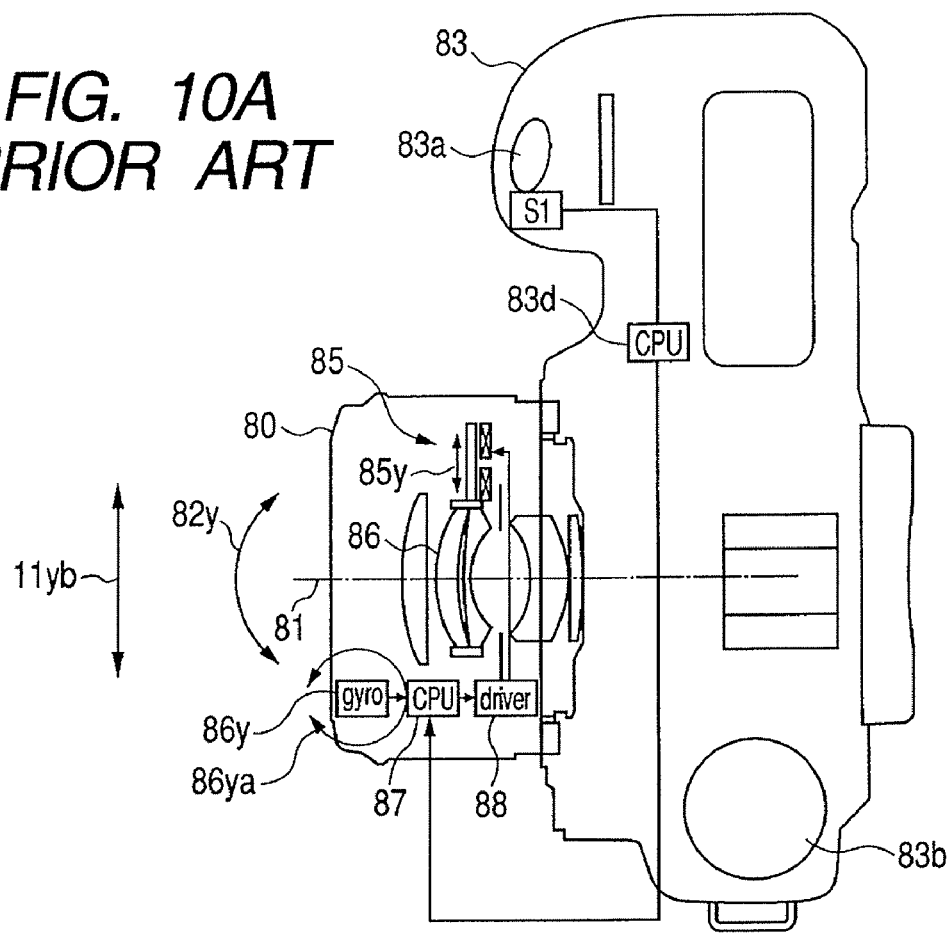
FIG. 10A is a top view of a conventional single lens reflex camera.
Figure 10B:
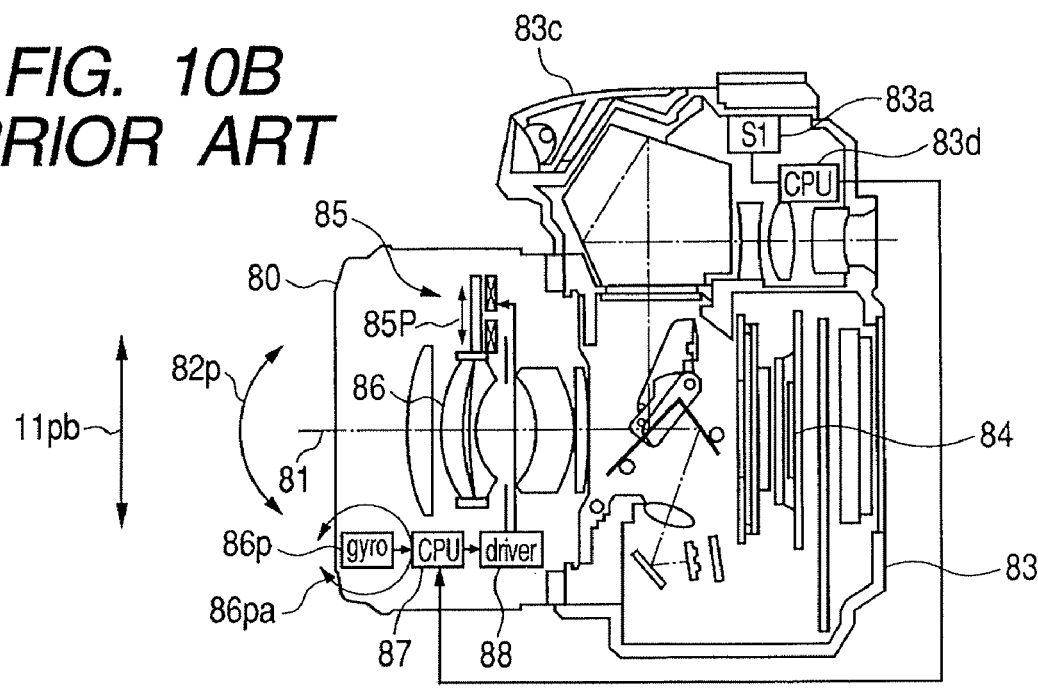
FIG. 10B is a side view of the conventional single lens reflex camera.

FIGS. 1A and 1B, respectively, are a top cross sectional view and a lateral cross sectional view of a single lens reflex camera according to the first embodiment of the present invention. What is different in this camera from the conventional image pickup apparatus shown in FIGS. 10A and 10B mentioned above is that acceleration sensors $11p$ and $11y$ are provided. The acceleration detection directions of the respective acceleration sensors $11p$ and $11y$ are indicated by arrows $11pa$ and $11ya$ in FIGS. 1A and 1B. Arrow $11pb$ and arrow $11yb$ represent shift shake in the respective directions.

Figure 2:
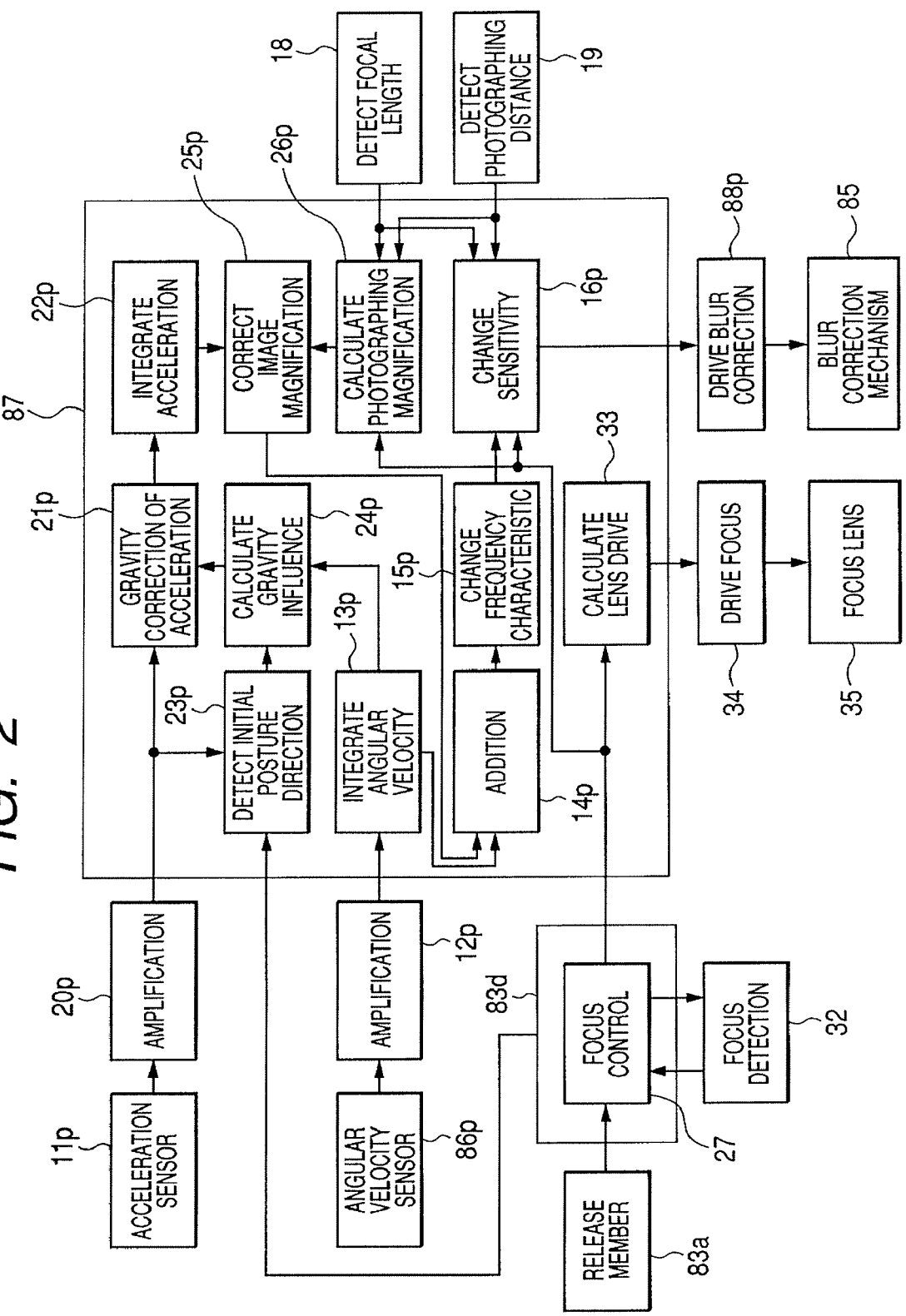
FIG. 2 is a block diagram showing the circuit configuration of the single lens reflex camera according to the first embodiment of the present invention.

FIG. 2 is a block diagram of a system including a circuit that processes signals indicative of shift shake detected by the acceleration sensors $11p$, $11y$ and rotational shake detected by angular velocity sensors $86p$, $86y$. This processing is effected mainly in a lens micro computer (CPU) 87. FIG. 2 shows signal processing only for reducing image blur caused by vertical camera shake (i.e., rotational shake (indicated by arrow $82p$) and shift shake indicated by arrow $11pb$ in FIG. 1B). However, signal processing for reducing image blur caused by horizontal camera shake (i.e., rotational shake (indicated by arrow $82y$) and shift shake (indicated by arrow $11yb$) in FIG. 1A) is also effected actually.

In FIG. 2, a shake angular velocity signal obtained by the angular velocity sensor $86p$ is input to an amplification circuit $12p$. The amplification circuit $12p$ not only simply amplifies the output of the angular velocity sensor $86p$, but also performs DC-removal for removing the DC component contained in the output from the angular velocity sensor $86p$ and high frequency attenuation for removing high frequency noise components. The output of this amplification circuit $12p$ is A/D (analog to digital)-converted and input to the lens micro computer 87. The input signal is numerically processed by the lens micro computer 87. This processing is illustrated as separate blocks for the sake of explanation.

The shake angular velocity signal taken into the lens micro computer 87 is input to an angular velocity integration circuit $13p$ in the lens micro computer 87. In the angular velocity integration circuit $13p$, high frequency components higher than approximately 0.1 Hz in the shake angular velocity signal are first-order integrated, so that the signal is converted into a shake angle signal. In this process, the integration range is narrowed at the time of starting the above mentioned integration (for example, only the frequency components higher than 1 Hz are integrated) to accelerate startup of the signal processing. This changing of the integration range will be referred to as time constant changing.

The above mentioned shake angle signal is input to an adding circuit 14p and summed with a shake displacement signal that will be described later, so that they are converted into a synthesized shake signal. The synthesized shake signal is input to a frequency characteristic changing circuit 15p, so that its frequency characteristic is changed. The frequency characteristic changing circuit 15p mainly attenuates low frequency components of the synthesized shake signal, wherein it determines the upper limit (e.g., 0.1 Hz or 5 Hz) of the frequencies to be attenuated and attenuates the signal components of these frequencies. More specifically, in the case that a large shake occurs when, for example, the camera is moved to change the framing, the degree of attenuation of the synthesized shake signal is made large (e.g., signal components lower than 5 Hz are attenuated). In such cases, blur correcting is not performed. In other words, if the above described frequency characteristic changing circuit 15p is not provided, blur correction is also performed for the shake component associated with camera movement for changing the framing, which will cause deterioration of good framing with the camera. The above process is introduced to prevent such a situation from occurring.

The output of the frequency characteristic changing circuit 15p is input to a sensitivity changing circuit 16p. The sensitivity changing circuit 16p changes the gain of the signal from the frequency characteristic changing circuit 15p based on signals from a focal length detection apparatus 18 and a photographing distance detecting apparatus 19 (i.e., zoom information and photographing distance information) that are input to the lens micro computer 87.

Generally, the blur correction sensitivity of the blur correction optical system (the correction lens 86, in this embodiment) in a zoom lens varies depending on the zoom condition and the focus condition. It is assumed, for example, that in a wide-angle zoom condition, a one-millimeter shift of the blur correction optical system causes a one-millimeter image displacement on the image plane. In this case, in a telephoto zoom condition, a one-millimeter shift of the blur correction optical system will cause, for example, a three-millimeter image displacement on the image plane. Similarly, the relationship between the shift amount of the blur correction optical system and the image displacement amount is different between a short subject distance and an infinite subject distance. In view of this, in order to correct the sensitivity, the gain of the signal from the frequency characteristic changing circuit 15p is varied based on zoom information and focusing condition information (for example at the telephoto zoom condition, the gain is reduced to one-third).

The focal length detection apparatus 18 is provided in the interchangeable lens 80 and composed of an encoder or the like that detects the position of the zoom lens. The focal length detecting apparatus 18 detects the focal length and outputs the detection result as zoom information. The photographing distance detection apparatus 19 is also provided in the interchangeable lens 80 and composed of an encoder or the like that detects the position of the focus lens. The photographing distance detection apparatus 19 detects the photographing distance and outputs the detection result as photographing distance information.

When the shutter release member 83a is half-depressed in preparation for shooting, switch S1 is turned on. In response to this, the focus control circuit 27 in the camera micro computer 83d drives the focus detection circuit 32 in the camera body 83, so that the focus state with respect to a subject to be photographed is detected. The detection result is output to a lens drive calculation circuit 33 as a defocus amount.

The lens drive calculation circuit 33 to which the defocus amount is supplied calculates a drive amount for the focus lens 35 from the above mentioned defocus amount. The drive amount is output to the focus drive apparatus 34, and the focus lens 35 is driven accordingly. After driving of the focus lens 35 is effected, the focus detection circuit 32 detects the focus state of the subject to be photographed again. If the focus state is satisfactory, a display indicative of the in-focus state is presented on a display apparatus that is not shown in the drawings. If the focus state is not satisfactory, driving of the focus lens 35 is effected again.

Information on the focusing distance (or the extension amount) of the focus lens 35 is continuously supplied to the sensitivity changing circuit 16p. The sensitivity changing circuit 16p interprets the focusing distance of the focus lens 35 at the time when focus detection is effected in the focus control circuit 27 via the focus detection circuit 32 as an image stabilization sensitivity value.

The magnification of the image is calculated based on the focusing distance of the focus lens 35 and the position of the zoom lens. The calculation of the magnification of image is triggered by focus detection effected by the focus control circuit 27. This means that the sensitivity of image blur correction is determined at the time when the zoom position is determined (it is assumed that the zoom position has been determined before the aforementioned switch S1 is turned on), the subject to be photographed is brought into focus and the focusing distance of the focus lens 35 is determined. Then, a blur correction value is determined by calculation. The magnification of image is also determined at the time when the subject to be photographed is brought into focus.

The blur correction value obtained in the above described manner is converted into a Pulse Width Modulated (PWM) signal and input to a blur correction drive apparatus 88p. The blur correction drive apparatus 88p drives a blur correction mechanism 85 based on the PWM signal input. Thus, image blur correction by the correction lens 86 is performed.

On the other hand, a shake acceleration signal from the acceleration sensor 11p is input to an amplification circuit 20p. The amplification circuit 20p not only simply amplifies the output of the acceleration sensor 11p, but also performs DC-removal for removing the DC component contained in the output from the acceleration sensor 11p and high frequency attenuation for removing high frequency noise components. The output of this amplification circuit 20p (i.e., shake acceleration signal) is A/D (analog to digital)-converted and input to the lens micro computer 87. The input shake acceleration signal is also numerically processed by the lens micro computer 87. This processing is also illustrated as separate blocks for the sake of explanation.

The shake acceleration signal taken into the lens micro computer 87 is input to the acceleration gravity-correction circuit 21p in the lens micro computer 87, in which correction of a gravity component is performed.

Here a reason why gravity component correction needs to be performed will be described.

Figure 3A:
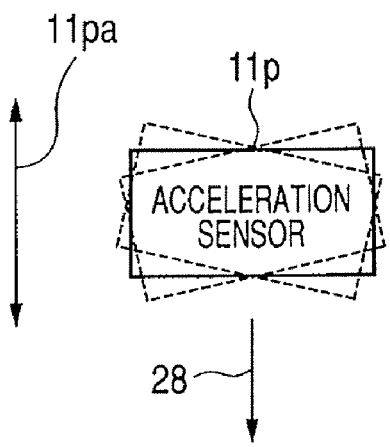
FIGS. 3A, 3B and 3C respectively illustrate a gravity error on an acceleration sensor, a gravity error in connection with a shake angle, and a gravity error in relation to the shake angle in the single lens reflex camera according to the first embodiment of the present invention.

Since the camera shown in FIG. 1B is in the horizontal orientation (posture) for photographing, the direction 11pa in which the acceleration sensor 11p is sensitive is the same as the direction of the force of gravity 28 as shown in FIG. 3A. In this state, the acceleration sensor 11p continuously outputs a signal associated with the gravity component, and the shift shake component is superimposed on the gravity component during detection. Since the signal output associated with the gravity component is a DC component, it can be removed by a DC removal circuit or the like provided in the amplification circuit 20p. However, the position of the acceleration sensor 11p changes in the manner shown by broken lines in FIG. 3A with changes in the rotation angle in shaking that occurs when the camera is held. Therefore, the direction of the force of gravity 28 relative to the direction of acceleration of the acceleration sensor 11p changes. Accordingly, the output of the acceleration sensor 11p changes with changes in the angle of shaking.

Figure 3B:
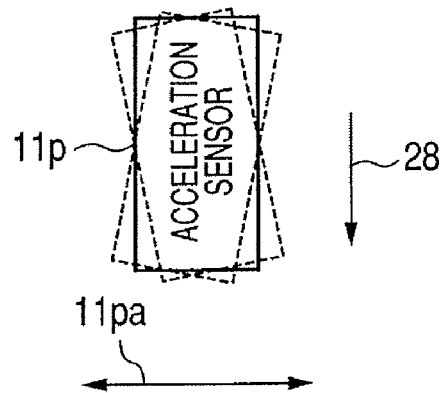
Figure 3C:
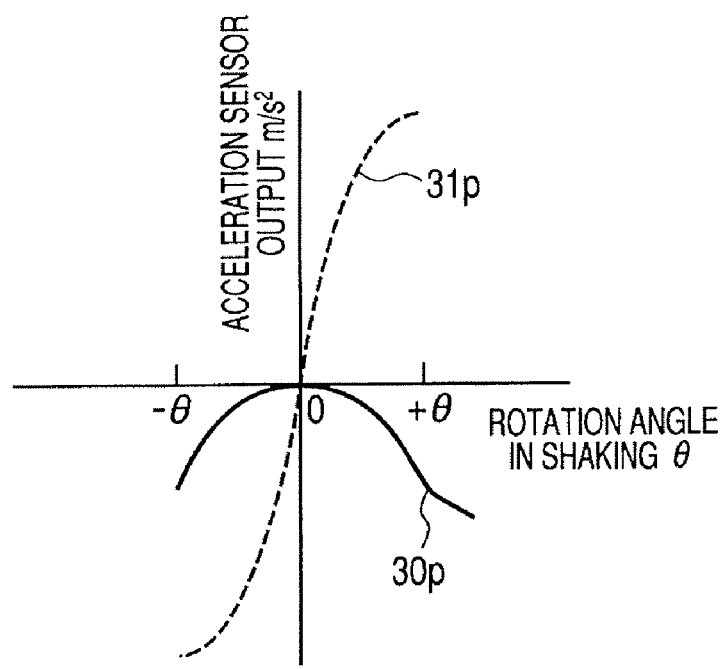

FIG. 3C is a graph showing changes of the output of the acceleration sensor 11p with the change in the posture of the acceleration sensor 11p, where the horizontal axis represents the change in the posture of the acceleration sensor 11p (rotation angle in shaking θ) and the vertical axis represents the output of the acceleration sensor 11p. Curve 30p represents the output of the acceleration sensor 11p. When the angle of posture (orientation) of the acceleration sensor 11p changes from zero (in the state indicated by the solid line in FIG. 3A in which 1 g acceleration is present) by a certain angle ±θ, the output of the acceleration sensor 11p changes (i.e., decreases) accordingly.

Figure 4:
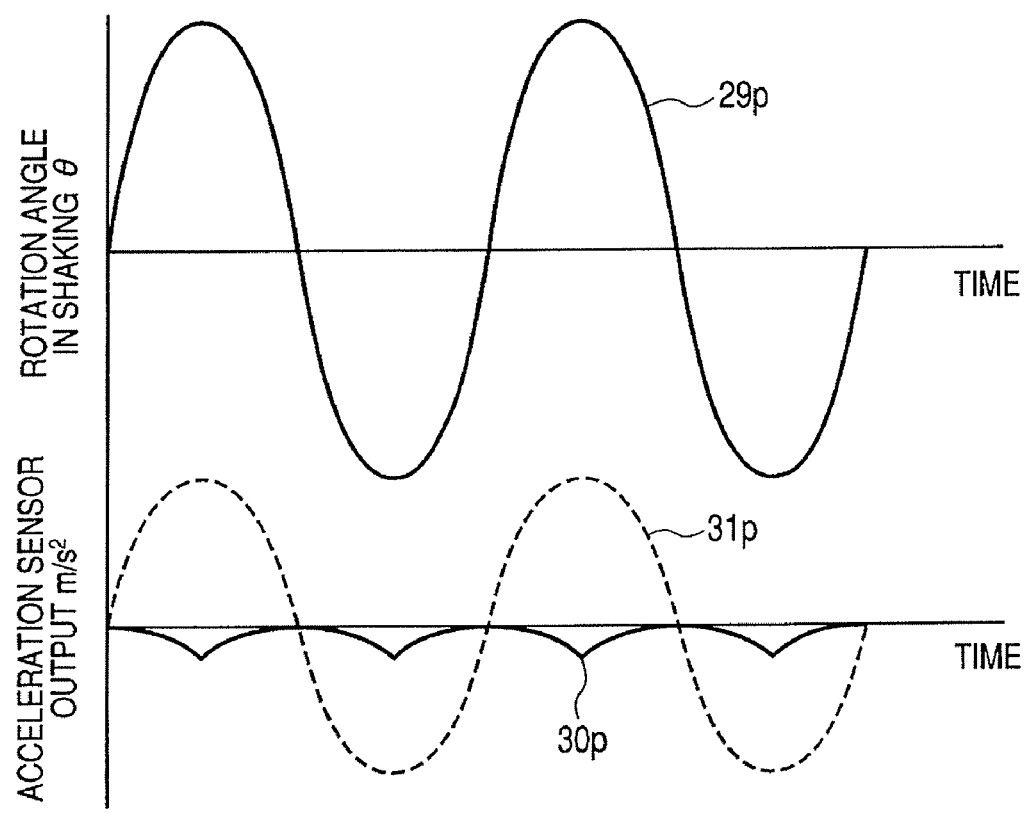
FIG. 4 is a graph that shows changes in the output of the acceleration sensor shown in FIG. 2 with changes in gravity, with the horizontal axis representing the time elapsed since the camera is held and the vertical axis representing the angle in shaking and the output of the acceleration sensor.

FIG. 4 is a graph that shows changes in the output of the acceleration sensor 11p with changes in the effect of gravity, on the sensor 11p due to the change in the orientation of the sensor 11p with the horizontal axis representing the time elapsed since the camera is held and the vertical axis representing the angle in shaking and the output of the acceleration sensor.

Even under the assumption that there is no shift blur, the acceleration sensor 11p outputs an error signal 30p due to changes in the effect of gravity on the sensor 11p that is caused by rotation angle in shaking 29p. At the time of close-up shooting, the camera is often oriented downwardly. FIG. 3B shows such a case, in which the direction of gravity 28 is substantially perpendicular to the direction 11pa in which the acceleration sensor 11p is sensitive. The error signal in this case is drawn by broken lines 31p in FIG. 3C and FIG. 4.

There is a difference in the magnitude of the signals 30p, 31p, as shown in FIG. 4, between the posture of the acceleration sensor 11p shown in FIG. 3A and the posture of the acceleration sensor 11p shown in FIG. 3B. This is because in the posture shown in FIG. 3A, the effect of the gravity is multiplied by a factor of the cosine of the angle in shaking, while in the posture shown in FIG. 3B, the effect of the gravity is multiplied by a factor of the sine of the angle in shaking. When the angle of change in the posture is small, the change in the sine is larger. To correct the effect of gravity, it is necessary to detect the angle in shaking and to know the posture of the acceleration sensor 11p (i.e., the angle of the sensitivity axis relative to the direction of gravity, which is different between FIG. 3A and FIG. 3B).

Referring back to FIG. 2, when the photography composition is determined by orienting the camera toward an subject to be photographed in preparation for shooting and the switch S1 is turned on with half-depression of the shutter release member 83a, photometry and focusing operations for that subject are started in response to a command by the camera micro computer 83d. At the same time, a signal indicative of turning-on of the aforementioned switch S1 is input to an initial posture direction detection circuit 23p in the lens micro computer 87 via the camera micro computer 83d. To the initial posture direction detection circuit 23p is also input an amplified acceleration signal from the amplification circuit 20p, and the initial posture direction detection circuit 23p determines the posture of the acceleration sensor 11p based on the magnitude of the acceleration signal at the time when the signal indicative of turning-on of the aforementioned switch S1 is input.

Since the photographer half-depresses the shutter release member 83a to turning-on the aforementioned switch S1 after he/she has determined the photography composition, the posture of the camera will not be changed significantly after that. Therefore, it is advantageous that the posture of the acceleration sensor 11p be determined upon input of the signal indicative of turning-on of the aforementioned switch S1. As will be apparent, determination of the posture may be performed after focusing onto the subject to be photographed is effected after the turning-on of the switch S1. In this case, however, it is not possible to integrate the output of the acceleration sensor 11p (which process will be described later) during the time from the turning-on of the switch S1 until the focusing. To save time, it is desirable that the determination of the posture of the acceleration sensor 11p be effected at the time when the aforementioned switch S1 is turned on.

When the acceleration detected by the acceleration sensor 11p is 1 g (gravitational acceleration) at the time when the signal indicative of turning-on of the aforementioned switch S1 is input, it is determined by the initial posture direction detection circuit 23p that the acceleration sensor 11p is in the posture shown in FIG. 3A. On the other hand, when the acceleration is 0 g, it is determined that the acceleration sensor 11p is in the posture shown in FIG. 3B. When the acceleration is between 1 g and 0 g, it is determined that the acceleration sensor 11p is in a posture corresponding to the acceleration.

A shake angle signal from the aforementioned angular velocity integration circuit 13p is input not only to the addition circuit 14p, but also to a gravity influence calculation circuit 24p. The gravity influence calculation circuit 24p performs a calculation for determining a change in the gravity component of the acceleration detected by the acceleration sensor 11p based on changes in the shake angle input. In this case, the process of calculation differs depending on the posture of the acceleration sensor 11p relative to the direction of gravity (i.e., the factor used in calculation is switched between cosine and sine) as described before. For this purpose, a signal from the initial posture direction detection circuit 23p is also input to the gravity influence calculation circuit 24p, and the coefficient or factor used in the calculation is changed depending on whether the posture is that shown in FIG. 3A or that shown in FIG. 3B.

Specifically, assuming that φ represents the angle in the posture direction, as shown in FIG. 3A, in which an acceleration of 1 g is detected by the acceleration sensor 11p acting on the camera is zero degree and θ represents the change in the posture from 4, the change in the output of the acceleration sensor 11p is obtained as G(COSφ−COS(φ+θ)). Here, φ is determined by the initial posture direction detection circuit 23p, and θ is determined as shake angle, and the result obtained is used in the gravity influence calculation performed in the gravity influence calculation circuit 24p.

The shake acceleration signal that has been amplified in the amplification circuit 20p is input to an acceleration gravity-correction circuit 21p. The acceleration gravity-correction circuit 21p calculates the difference between the shake acceleration signal and the change in the signal of the acceleration sensor 11p associated with the change in the effect of gravity due to the orientation of the sensor 11p obtained by the gravity influence calculation circuit 24p, whereby the error in the output of the acceleration sensor 11p generated by the influence of gravity is eliminated. The shake acceleration output from which the error component has been removed is input to the acceleration integration circuit 22p. The acceleration integration circuit 22p performs second order integration of the shake acceleration signal that has been corrected with respect to the influence of gravity and is input from the acceleration gravity-correction circuit 21p to convert it into a displacement of shaking. Similarly, to the aforementioned process in the angular velocity integration circuit 13p, the acceleration integration circuit 22p is adapted to perform second order integration of high frequency components higher than approximately 0.1 Hz contained in the shake acceleration signal, thereby converting it into a signal representing the displacement of shaking. At the time when the integration is started, the integration band is narrowed (for example, only the frequency components higher than 1 Hz is integrated) to accelerate startup of the signal processing (i.e., to change the time constant).

The shake displacement signal from the acceleration integration circuit 22p is input to an image magnification correction circuit 25p. A photographing magnification calculation circuit 26p calculates the photographing magnification based on zoom information from the focal length detection apparatus 18 and photographing distance information from the photographing distance detection apparatus 19. As described before, the focal length detection apparatus 18 is provided in the interchangeable lens 80 and composed of an encoder or the like that detects the position of the zoom lens. The focal length detection apparatus 18 detects the focal length and outputs it as zoom information. The photographing distance detection apparatus 19 is also provided in the interchangeable lens 80 and composed of an encoder or the like that detects the position of the focus lens. The photographing distance detection apparatus 19 detects the photographing distance and outputs it as photographing distance information. As described before, the focus control circuit 27 performs a control of the camera for extending the focus lens 35. After completion of the extension of the focus lens 35, at the time when the focus control circuit 27 detects an in-focus state, the photographing magnification is calculated in the aforementioned photographing magnification calculation circuit 26p based on the output of the focal length detection apparatus 18 and the output of the photographing distance detection apparatus 19.

The influence of shift shake 11pb, 11yb on the image becomes significant as the subject distance is short and the focal length used is large (i.e., when the photographing magnification is high), while the shift shake affects the image little as the subject distance is long (i.e., when the photographing magnification is low). For this reason, it is necessary that the displacement in shaking (shift shake) obtained through detection by the acceleration sensor 11p, 11y and calculation performed thereafter be amplified in accordance with the photographing magnification so as to be converted into a blur correction value.

The image magnification correction circuit 25p amplifies the displacement of shaking obtained in the acceleration integration circuit 22p based on a value calculated in the photographing magnification calculation circuit 26p (wherein the longer the focal length is and the shorter the subject distance is, the larger the photographing magnification calculated by the photographing magnification calculation circuit 26p becomes). The addition circuit 14p adds up the signal from the angular velocity integration circuit 13p and the signal from the image magnification correction circuit 25p (a signal based on the acceleration integration circuit 22p). However, in cases where the subject distance is large and the focal length used is short, the output obtained is nearly equal to the output of the angular velocity integration circuit 13p, as described above.

The operations of the addition circuit 14p and the subsequent circuits are the same as those described before, namely, the output is converted into a blur correction value through the frequency characteristic changing circuit 15p for facilitating changing of framing and the sensitivity changing circuit 16p for adjusting the degree of blur correction effect according to the sensitivity of the optical system, and the blur correction mechanism 85 is driven based on that value.

Figure 5:
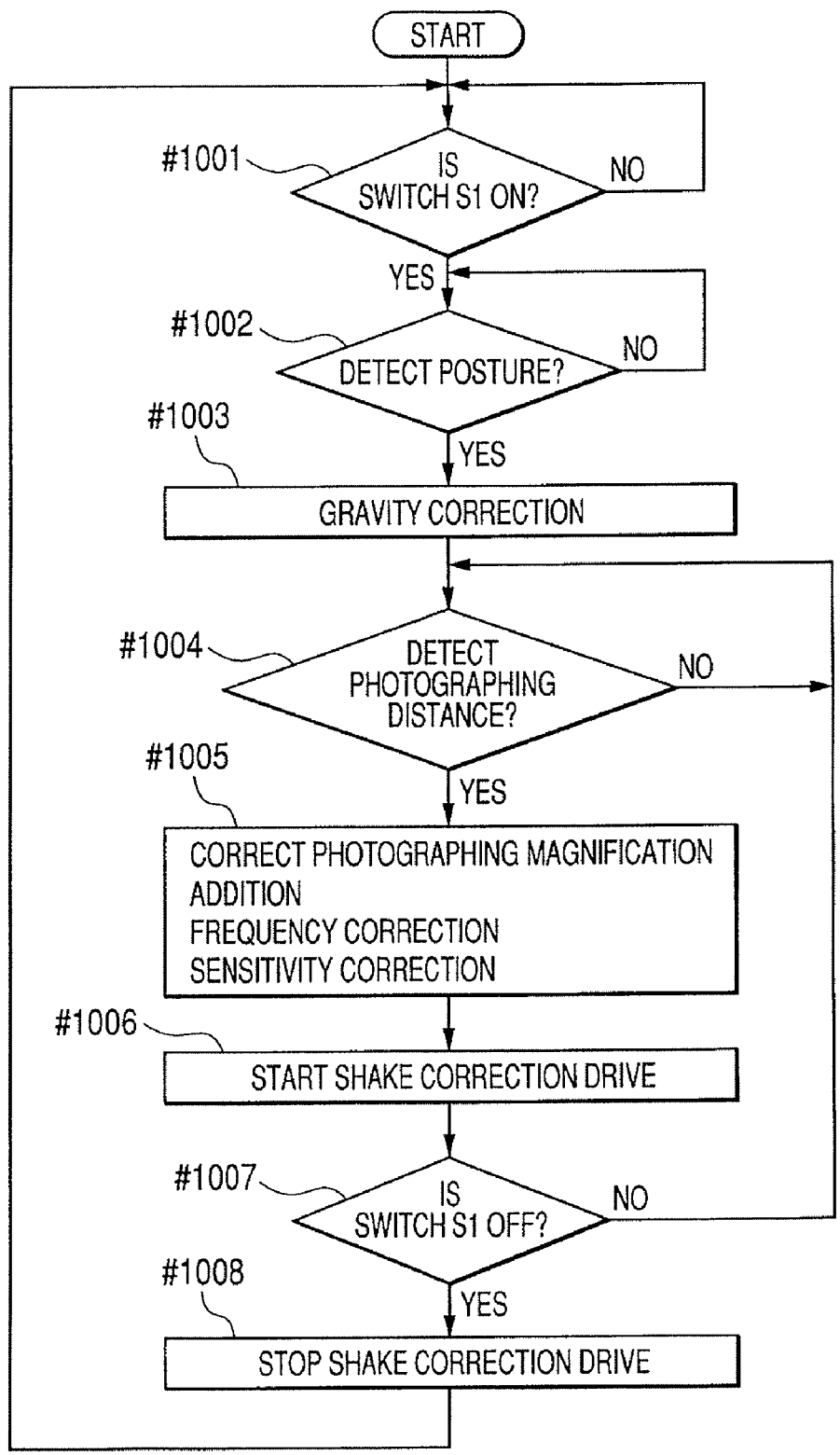
FIG. 5 is a flow chart of an operation relating to image blur correction in the single lens reflex camera according to the first embodiment of the present invention.

FIG. 5 is a flow chart of the operation relating to image blur correction in the first embodiment of the present invention. The process is started upon turning-on of the main power of the camera. To facilitate understanding of the relevant configuration in the first embodiment, various control steps implemented in the camera (such as a battery check, photometry, ranging, lens driving for auto-focusing and charging of the electric flash, etc.) have been omitted from the flow chart. In the following, the description of the process is directed to the case where the rotational shake 82p and the shift shake 11pb of the camera are detected by the angular velocity sensor designated by reference sign 86p and the acceleration sensor designated by reference sign 11p. The process in the case where the rotational shake 82y and the shift shake 11yb of the camera are detected by the angular velocity sensor designated by reference symbols 86y and the acceleration sensor designated by reference symbols 11y is the same, and the description thereof will be omitted.

Referring to FIG. 5, in step #1001, the process is in a standby state, waiting for turning on of the switch S1 with half-depression of the shutter release member 83a. When the switch S1 is turned on with half-depression of the shutter release member 83a, the process proceeds to step #1002. In step #1002, the posture of the camera is detected (or determined) by the initial posture direction detection circuit 23p based on a signal from the acceleration sensor 11p.

Here, how the posture of the camera is detected will be described. When gravitational acceleration components detected by the acceleration sensor 11p and 11y are detected, in the case, for example, where the camera is held horizontally as shown in FIGS. 1A and 1B, the acceleration sensor 11p outputs 1 g, and the acceleration sensor 11y outputs 0 g. When the camera is held vertically (held in a vertical composition) while keeping the optical axis 81 horizontally, the acceleration sensor 11p outputs 0 g, and the acceleration sensor 11y outputs 1 g. When the camera is oriented upwardly or downwardly, both the acceleration sensors 11p and 11y output 0 g. Thus, the posture or orientation of the camera is detected based on these outputs. The reason why the posture is determined at the time when the switch S1 is turned on is that the photographer generally half-depresses the shutter release member 83 after holding the camera in a stable state with a determined framing, and therefore the posture is rarely changed after that.

When it is determined based on signals from the acceleration sensors 11p, 11y that the camera is in the posture shown in FIGS. 1A and 1B, the gravity influence calculation circuit 24p performs gravity correction on the output of the acceleration sensor 11p. However, gravitation correction is not performed on the output of the acceleration sensor 11y, and the correction amount in the acceleration gravity-correction circuit 21y is set to zero (since there is inherently no change in the gravitational acceleration component caused by rotational shake). Accordingly, an acceleration gravity-correction circuit 21y (which is provided to correct influence of gravity on the acceleration sensor 11y and has the configuration same as the acceleration gravity-correction circuit 21*p* though not shown in the drawings) does not perform gravity correction on the acceleration sensor 11*y*.

On the other hand, when the camera is held vertically (acceleration sensor 11*p* outputting 0 g and acceleration sensor 11*y* outputting 1 g), gravity correction on the acceleration sensor 11*y* is performed based on the signal of the angular velocity sensor 86*y*. However, gravity correction on the acceleration sensor 11*p* according to the signal of the angular velocity sensor 86*p* is not performed.

The correction amount in the acceleration gravity-correction circuit 21*p* calculated by the gravity influence calculation circuit 24*p* is zero. When the camera is held in downward or upward orientation (acceleration sensor 11*p* outputting ±1 g and acceleration sensor 11*y* outputting ±1 g), gravity correction on the acceleration sensor 11*p* is performed based on the signal of the angular velocity sensor 86*p*. In addition, gravity correction on the acceleration sensor 11*y* is performed based on the signal of the angular velocity sensor 86*y*.

As per the above, whether to perform the gravity correction or not is determined according to the posture of the camera. The signals from the acceleration sensors 11*p* and 11*y* contain not only gravitational acceleration but also acceleration caused by shift shake superimposed thereon. In view of this, the signals from the acceleration sensors 11*p*, 11*y* are respectively averaged over a predetermined time (e.g., one second) so as to pick up only the gravity component.

After completion of posture detection, the process proceeds to step #1003. In step #1003, the gravitational acceleration component acting on the acceleration sensor 11*p* is calculated by the gravitation influence calculation circuit 24*p* based on the posture of the camera determined by the initial posture direction detection circuit 23*p* and the shake angle information from the angular velocity integration circuit 13*p*. The error output is corrected in the acceleration gravity-correction circuit 21*p*.

In the next step #1004, the process is in a standby state until extension of the lens for focusing is completed. Specifically, the focus state of the subject is detected by the focus control circuit 27 and the focus detection circuit 32, and an extension amount for driving the focus lens 35 is calculated by the lens drive calculation circuit 33. Thereafter, the focus lens 35 is driven by the focus lens drive circuit 34. The process is in a standby state until the time at which the focus detection circuit 32 detects, again after driving of the focus lens, that the subject is in focus. Then, upon completion of extension of the lens, the lens extension amount is detected by the photographing distance detection apparatus 19, whereby the photographing distance (or the subject distance) is detected.

In the next step #1005, zoom information is obtained by the focal length detection apparatus 18. Then, the photographing magnification is calculated by the photographing magnification calculation circuit 26*p* based on the zoom information and the photographing distance determined in step #1004. The gain of the displacement in shaking obtained in the acceleration integration circuit 22*p* is changed by the image magnification correction circuit 25*p* based on the result of calculation by the photographing magnification calculation circuit 26*p*. The resultant output is added to the shake angle signal from the angular velocity integration circuit 13*p* through the addition circuit 14*p*. The frequency band for which blur correction is to be performed is changed by the frequency characteristic changing circuit 15*p* according to the photographing condition. Thereafter, a blur correction value is calculated with the gain being changed by the sensitivity changing circuit 16*p* based on the image stabilization sensitivity determined by the focal length detection apparatus 18 and the photographing distance detection apparatus 19.

In the next step #1006, driving of the blur correction mechanism 85 is started according to the blur correction value obtained in the above step #1005 to perform image blur correction. In the next step #1007, it is detected whether or not the switch S1 has been turned off by release of half-depression of the shutter release member 83*a*. When it is detected that the switch S1 has been turned off, the process proceeds to step #1008. On the other hand, when it is detected that the switch S1 is still on, the process returns back to step #1004. This means that as long as the switch S1 is on, the gain of the blur correction value is changed according to the image magnification and sensitivity that change with the photographing distance (subject distance). Image blur correction is also continued together with the changing of the gain. It is assumed that there is no change in the posture of the acceleration sensor 11*p* for gravity correction during this process.

When it is determined in step #1007 that the switch S1 is off, the process proceeds to step #1008, where driving of the blur correction mechanism 85 is stopped. Then, the process returns back to step #1001 and waits until the switch S1 is turned on again by half-depression of the shutter release switch 83*a*.

In the first embodiment described in the foregoing, changes in the effect of gravity acting on the acceleration sensors 11*p*, 11*y* due to the orientation thereof is detected by the acceleration gravity-correction circuits 21*p*, 21*y* based on the outputs of the angular velocity integration circuits 13*p*, 13*y* that perform calculation on the output of the angular velocity sensors 86*p*, 86*y*. Thus, the influence of gravity on the acceleration sensors 11*p*, 11*y* is corrected.

More specifically, angular velocities 86*pa*, 86*ya* of shaking are detected by the angular velocity sensors 86*p*, 86*y*, and accelerations 11*pa*, 11*ya* of shaking are detected by the acceleration sensors 11*p*, 11*y*. Blur correction values are determined by a calculation performed on the above mentioned angular velocities 86*pa*, 86*ya* by angular velocity integration circuits 13*p*, 13*y*. The above mentioned accelerations 11*pa*, 11*ya* are corrected by the acceleration gravity-correction circuits 21*p*, 21*y* based on the outputs of the angular velocity integration circuits 13*p*, 13*y*. The blur correction mechanism 85 that decenters the photographing optical axis is driven by the blur correction drive circuit 88*p* based on the outputs of the acceleration gravity-correction circuits 21*p*, 21*y* and the outputs of the angular velocity integration circuits 13*p*, 13*y*.

Accordingly, shift shake can be detected reliably with a simple system, and highly accurate image blur correction is possible even for subjects at very short distances.

According to the first embodiment, shake angles are calculated by angular velocity integration circuits 13*p*, 13*y* by integrating the outputs of the angular velocity sensors 86*p*, 86*y*. In addition, changes in the direction of the influence of gravity on the acceleration sensors are calculated by the gravity influence calculation circuits 24*p*, 24*y* based on the outputs of the angular velocity integration circuits 13*p*, 13*y*. The outputs of the acceleration sensors 11*p*, 11*y* are corrected by the acceleration gravity-correction circuits 21*p*, 21*y* based on the outputs of the gravity influence calculation circuits 24*p*, 24*y*. Displacements in shaking are calculated by the acceleration integration circuits 22*p*, 22*y* based on the outputs of the acceleration gravity correction circuits 21*p*, 21*y*. The blur correction mechanism 85 that decenters the photographing optical axis is driven by the blur correction drive circuit 88*p* based on the outputs of the acceleration integration circuits 22*p*, 22*y* and the outputs of the angular velocity integration circuits 13*p*, 13*y*.

According to the first embodiment, the initial posture directions of the acceleration sensors 11p, 11y are detected by the initial posture direction detection circuits 23p, 23y based on the outputs of the acceleration sensors 11p, 11y that are obtained in synchronization with operation of the release member 83a in preparation for shooting. The calculation in the gravity influence calculation circuits 24p, 24y is changed based on the outputs of the initial posture direction detection circuits 23p, 23y. Thus, the outputs of the acceleration sensors 11p, 11y are corrected based on the outputs of the gravity influence correction circuits 24p, 24y.

Furthermore, according to the first embodiment, frequency characteristics of the outputs of the acceleration integration circuits 22p, 22y and the angular velocity integration circuits 13p, 13y are changed by the frequency characteristic changing circuits 15p, 15y. The photographing optical axis is decentered by the blur correction mechanism 85 based on the outputs of the frequency characteristic changing circuits 15p, 15y. The photographing magnification is calculated by the photographing magnification calculation circuit 26p based on the output of the photographing distance detection apparatus 19 that detects the photographing distance to the subject to be photographed and the output of the focal length detection apparatus 18 that detects the focal length of the photographing optical system. The outputs of the acceleration integration circuits 22p, 22y are corrected by the image magnification correction circuits 25p, 25y based on the output of the photographing magnification calculation circuit 26p.

Accordingly, shift shake can be detected stably with a simple system, and highly accurate image blur correction is possible even for subjects at very short distances. In view of the fact that the degree of influence of the gravity varies depending on the orientation (or posture) of the acceleration sensors 11p, 11y relative to the direction of gravitation, the system is adapted to detect the posture of the acceleration sensors 11p, 11y in synchronization with operation of the release member 83a. Therefore, shift shake can be detected stably every time preparation for photographing is performed.

The camera according to the first embodiment is provided with a photographing optical system and a focusing means (the focus control circuit 27, the focus detection circuit 32, the lens drive calculation circuit 33 and the focus drive circuit 34) for focusing the photographing optical system on the subject to be photographed. The initial posture upon photographing is detected by the initial posture direction detection circuit 23p based on the outputs of the acceleration sensors 11p, 11y obtained in synchronization with half-depression of the release member 83a for activating the aforementioned focusing means. The camera is also provided with acceleration gravity-correction means (the angular velocity integration circuits 13p, 13y, the gravity influence calculation circuits 24p, 24y and the acceleration gravity-correction circuits 21p, 21y) for correcting the outputs of the acceleration sensors 11p, 11y based on the outputs of the angular velocity sensors 86p, 86y and the outputs of the initial posture direction detection circuits 23p. The blur correction mechanism 85 that decenters the photographing optical axis is driven by the blur correction drive circuit 88p based on the outputs of the acceleration gravity-correction means and the outputs of the angular velocity integration circuits 13p, 13y.

Accordingly, shift shake can be detected reliably with a simple system, and highly accurate image blur correction is possible even for subjects at very short distances.

According to the first embodiment, the initial posture upon photographing is detected by the initial posture direction detection circuits 23p, 23y based on the signals of the pair of acceleration sensors 11p, 11y. The outputs of the acceleration sensors 11p, 11y are corrected by the acceleration gravity-correction circuits 21p, 21y based on the outputs of the angular velocity sensors 86p, 86y and the outputs of the initial posture direction detection circuits 23p, 23y. In addition, a determination is made by the gravity influence calculation circuits 24p, 24y as to whether to correct the acceleration outputs based on the signals of the initial posture direction detection circuits 23p, 23y is to be performed by the acceleration gravity-correction circuits 21p, 21y. When it is determined that correction of the acceleration outputs is necessary, correction of the acceleration outputs is performed by the acceleration gravity-correction circuits 21p, 21y. The blur correction mechanism 85 that decenters the photographing optical axis is driven by the blur correction drive circuit 88p based on the outputs of the acceleration gravity-correction circuits 21p, 21y and the outputs of the angular velocity sensors 86p, 86y.

Accordingly, shift shake can be detected reliably with a simple system, and highly accurate image blur correction is possible even for subjects at very short distances.

Second Embodiment

Figure 6:
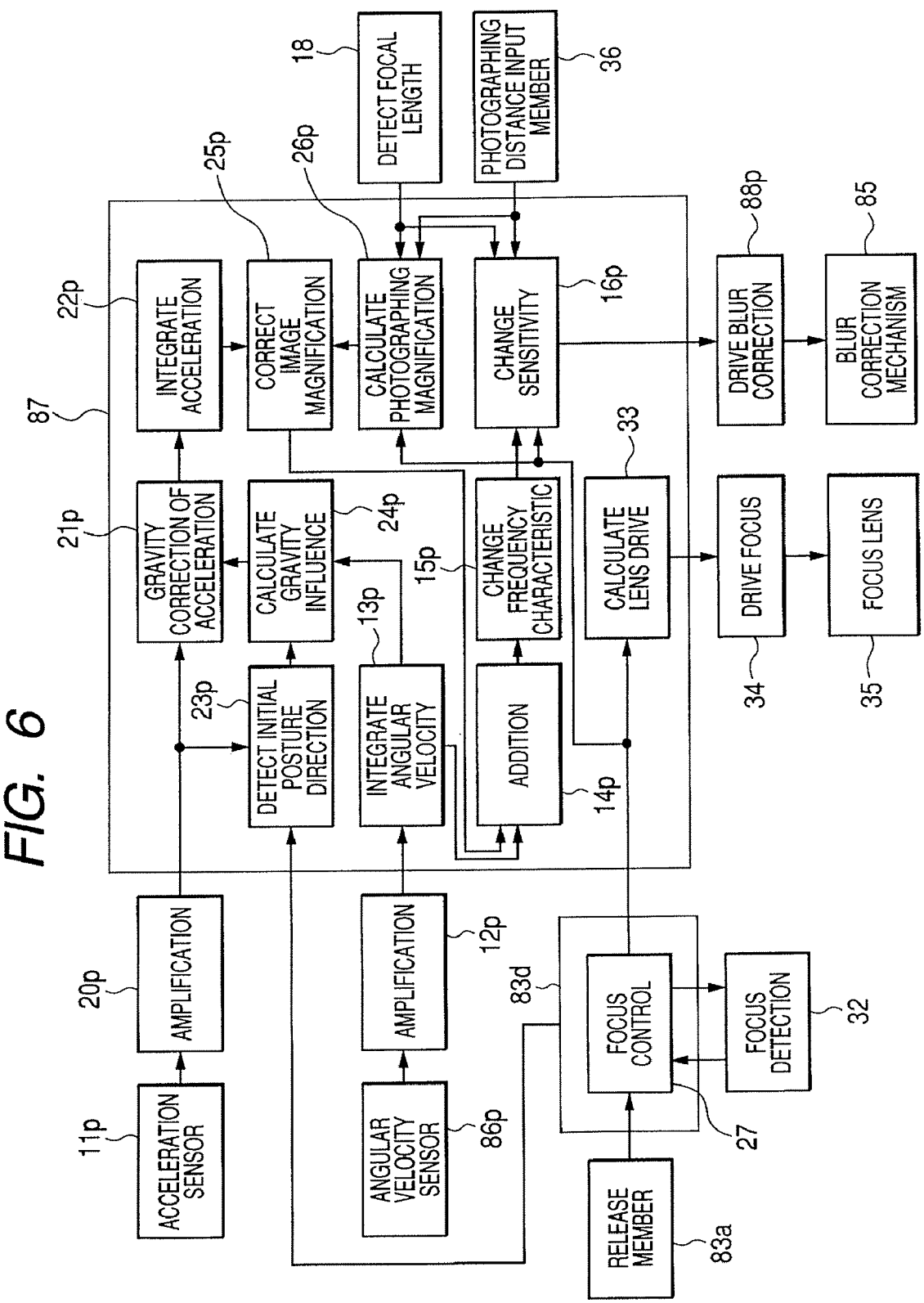
FIG. 6 is a block diagram showing the circuit configuration of the single lens reflex camera according to a second embodiment of the present invention.

FIG. 6 is a block diagram showing the circuit configuration of a single lens reflex camera according to a second embodiment of the present invention. What is different in the configuration shown in FIG. 6 from that shown in FIG. 2 is that the photographing distance detection apparatus 19 is replaced by a photographing distance input member 36.

Figure 7A:
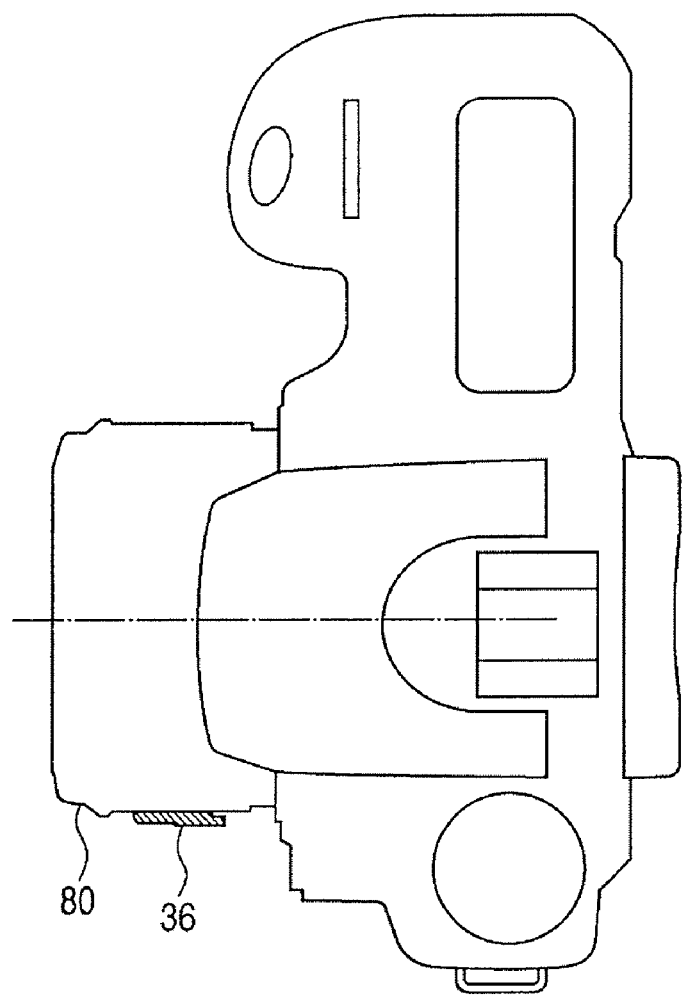
FIG. 7A is a plan view of the single lens reflex camera according to the second embodiment of the present invention.
Figure 7B:
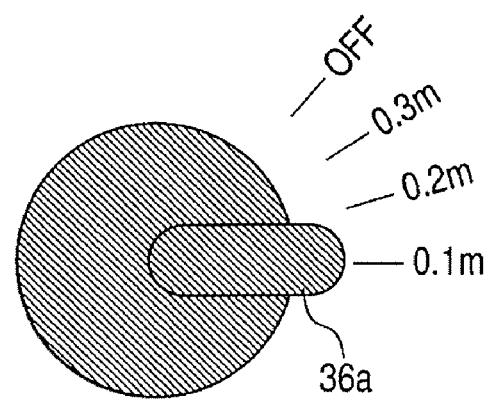
FIG. 7B is an enlarged view of a photographing distance input member in the single lens reflex camera according to the second embodiment of the present invention.

The photographing distance input member 36 is provided on a side of the interchangeable lens 80, as shown in FIG. 7A. FIG. 7B is an enlarged view of the photographing distance input member 36 as seen from its front.

It is possible to input or enter the photographing distance by operating a dial knob 36a provided on the photographing distance input member 36. In the case illustrated in FIG. 7B, a photographing distance range from the closest distance up to 0.1 meter, a photographing distance range up to 0.2 meter, a photographing distance range up to 0.3 meter and a photographing distance range longer than 0.3 meter (OFF) can be input.

Upon operating the photographing distance input member 36, it is necessary for the photographer to determine the photographing distance in advance. By the photographer operation, the photographing magnification calculation circuit 26p starts to operate immediately (contrary to the above described first embodiment, in which the photographing magnification calculation circuit 26p cannot calculate the photographing magnification until lens drive for focusing is completed).

The photographing magnification calculation circuit 26p recognizes the photographing distance from the signal from the photographing distance input member 36, recognizes the focal length upon photographing from the signal from the focal length detection apparatus 18, and calculates the photographing magnification based on them. For example, when the photographing distance entered through the photographing distance input member 36 is 0.1 meter, the image magnification is large, and the gain of the displacement in shaking obtained from the acceleration integration circuit 22p is made large. In contrast, when the dial knob 36a for entering the photographing distance is set to OFF (i.e., longer than 0.3 meter), the photographing magnification is considered to be very low, and the gain of the displacement in shaking obtained from the acceleration integration circuit 22p is set to zero.

As per the above, the photographing magnification calculation circuit 26*p* is independent from the ranging and focusing operations, and therefore, it is possible to shorten the time from the holding of the camera for shooting to the start of shift blur correction.

Figure 8:
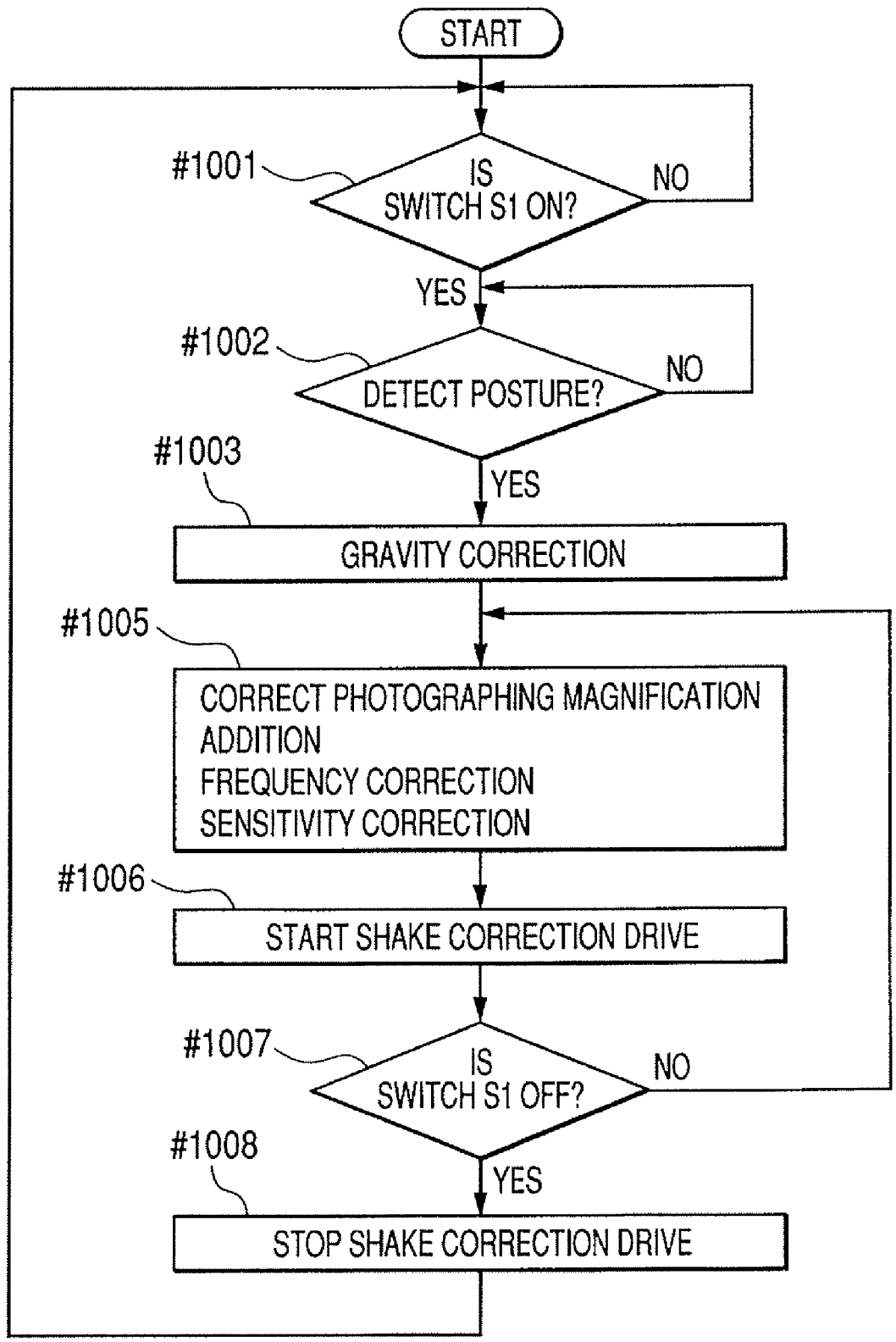
FIG. 8 a flow chart of the operation relating to image blur correction in the single lens reflex camera according to the second embodiment of the present invention.

FIG. 8 is a flow chart of the operation relevant to blur correction in the camera according to the second embodiment of the present invention. The process shown in FIG. 8 differs from the process of the first embodiment shown in FIG. 5 in that the photographing distance detection process of step #1004 in FIG. 5 is eliminated. This is because it is not necessary to wait for the completion of lens extension and detection of in-focus state. Accordingly, the time until image blur correction is started can be shortened.

In the second embodiment described above, thanks to the photographing distance input member 36, it is possible to shorten the time until the image magnification is calculated, and blur correction can be started earlier.

Specifically, according to the second embodiment, angular velocities 86*pa*, 86*ya* in shaking are detected by the angular velocity sensors 86*p*, 86*y*. In addition, accelerations in shaking 11*pa*, 11*ya* are detected by the acceleration sensors 11*p*, 11*y*. Furthermore, shake angles are calculated by the angular velocity integration circuits 13*p*, 13*y* by integrating the outputs of the angular velocity sensors 86*p*, 86*y*. A change in the direction in which gravity influences the acceleration sensor due to a change in the orientation of the acceleration sensor is detected by the gravity influence calculation circuit 24*p* based on the outputs of the angular velocity integration circuits 13*p*, 13*y*. The outputs of the acceleration sensors 11*p*, 11*y* are corrected by the acceleration gravity-correction circuits 21*p*, 21*y* based on the output of the gravity influence calculation circuit 24*p*. Displacements in shaking are calculated by the acceleration integration circuits 22*p*, 22*y* based on the outputs of the acceleration gravity-correction circuits 21*p*, 21*y*. The blur correction mechanism 85 that decenters the photographing optical axis is driven by the blur correction drive circuit 88*p* based on the outputs of the acceleration integration circuits 22*p*, 22*y* and the outputs of the angular velocity integration circuits 13*p*, 13*y*.

Furthermore, according to the second embodiment, the photographing magnification is calculated by the photographing magnification calculation circuit 26*p* based on the output of the photographing distance input member 36 for allowing entry of the photographing distance to the subject and the output of the focal length detection apparatus 18 for detecting the focal length. The outputs of the acceleration integration circuits 22*p*, 22*y* are corrected by the image magnification correction circuits 25*p*, 25*y* based on the output of the photographing magnification calculation circuit 26*p*.

Accordingly, shift shake can be detected reliably with a simple system, and highly accurate image blur correction is possible even for subjects at very short distances.

Furthermore, according to the second embodiment, the outputs of the acceleration sensors 11*p*, 11*y* are corrected by the acceleration gravity-correction circuits 21*p*, 21*y* based on the output of gain setting means for setting the gain according to an operation (i.e., the photographing distance input member 36) and the outputs of the angular velocity sensors 86*p*, 86*y*. The blur correction mechanism 85 that decenters the photographing optical axis is driven by the blur correction drive circuit 88*p* based on the outputs of the acceleration gravity-correction circuits 21*p*, 21*y* and the outputs of the angular velocity sensors 86*p*, 86*y*.

Accordingly, shift shake can be detected reliably with a simple system, and highly accurate image blur correction is possible even for subjects at very short distances.

Third Embodiment

Figure 9:
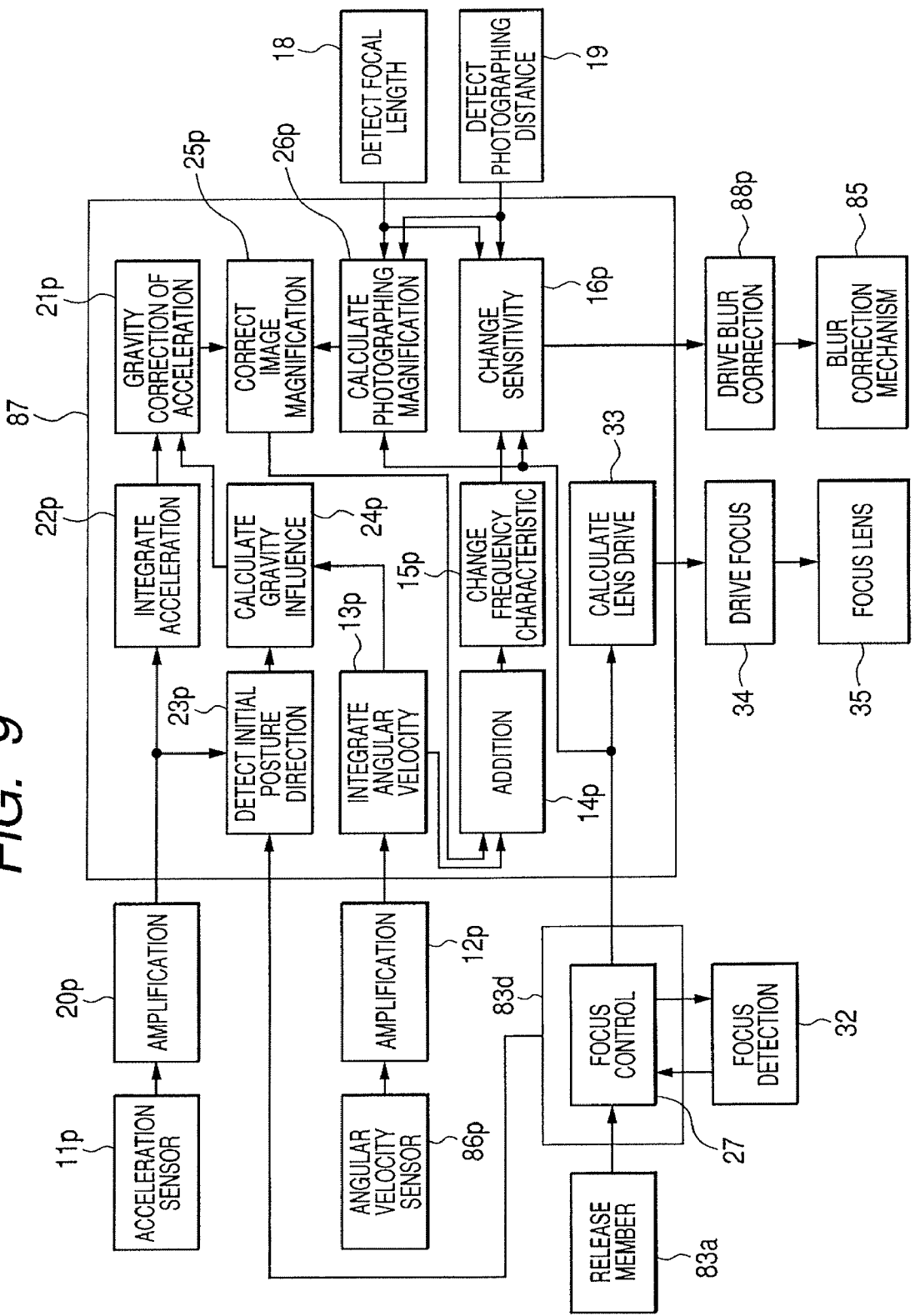
FIG. 9 is a block diagram showing the circuit configuration of the single lens reflex camera according to a third embodiment of the present invention.

FIG. 9 is a block diagram showing the circuit configuration of a single lens reflex camera according to a third embodiment of the present invention. The configuration shown in FIG. 9 differs from that of the first embodiment in that the shake acceleration signal from the acceleration sensor 11*p* is converted into displacement in shaking through second-order integration in the acceleration integration circuit 22*p*, and thereafter integration error generated by superimposed gravity is corrected by the acceleration gravity-correction circuit 21*p*. In the block diagram shown in FIG. 9, the photographing distance detection apparatus 19 may be replaced by a photographing distance input member 36.

The gravity influence calculation circuit 24*p* calculates the influence of gravity based on the shake angle signal from the angular velocity integration circuit 13*p* and the signal of the initial posture direction detection circuit 23*p*. However, the process is different from that in the above described first embodiment in that the influence of gravity thus obtained is subjected to second-order integration so that a gravitational error is converted into a shake displacement error.

Specifically, the error signals 30*p*, 31*p* shown in FIG. 4 are subjected to second-order integration so as to be converted into integrated error signals, which are input into the acceleration gravity-correction circuit 21*p*. The acceleration gravity-correction circuit 21*p* subtracts the integrated error signal from the shake displacement signal obtained by the acceleration integration circuit 22*p* to remove the gravitational error contained in the output of the acceleration sensor 11*p*.

In the above described method in which both the output of the acceleration sensor 11*p* and the gravitational error signal are integrated and then subjected to subtraction, the accuracy of the signal can be kept higher than that in the method in which the error signal is subtracted before integration. This is because in the case where influence of gravity is corrected by subtraction performed before integration, a residual error remaining after correction is enlarged by integration, since integration enlarges a small error also. In contrast, in the case where influence of gravity is corrected after integration, such an error is not enlarged.

In the third embodiment, the output of the acceleration sensor 11*p* is subjected to second-order integration so as to be converted into displacement in shaking, and the gravitational error component superimposed on the displacement in shaking is removed. However, the present invention is not limited to this particular feature. For example, the output of the acceleration sensor 11*p* may be subjected to first-order integration so as to be converted into velocity in shaking, the error signal shown in FIG. 4 may also be subjected to first-order integration and signal correction according to the initial posture direction, and then the difference between them may be obtained. Thereafter, the difference may be integrated again so as to be converted into displacement in shaking.

In the above described third embodiment, since gravitational error correction is performed after integrating the acceleration output, it is possible to enhance accuracy of error correction.

Specifically, according to the third embodiment, angular velocities 86*pa*, 86*ya* in shaking are detected by the angular velocity sensors 86*p*, 86*y*. In addition, accelerations in shaking 11*pa*, 11*ya* are detected by the acceleration sensors 11*p*, 11*y*. Furthermore, shake angles are calculated by the angular velocity integration circuits 13*p*, 13*y* by integrating the outputs of the angular velocity sensors 86*p*, 86*y*. Displacements in shaking are calculated by the acceleration integration means 22*p*, 22*y* through second-order integration of the acceleration outputs. A change in the direction of the influence of gravity on the acceleration sensors due to a change in the orientation thereof is detected by the gravity influence calculation circuits 24p, 24y based on the outputs of the angular velocity integration circuits 13p, 13y. The outputs of the acceleration integration circuits 22p, 22y are corrected by the acceleration gravity-correction circuits 21p, 21y based on the output of the gravity influence calculation circuits 24p, 24y. The blur correction mechanism 85 that decenters the photographing optical axis is driven by the blur correction drive circuit 88p based on the outputs of the acceleration gravity-correction circuits 21p, 21y and the outputs of the angular velocity integration circuits 13p, 13y.

Accordingly, shift shake can be detected reliably with a simple system, and highly accurate image blur correction is possible even for subjects at very short distances.

As will be apparent from the foregoing descriptions, according to the first to third embodiments, satisfactory blur correction can be achieved even in macro photographing with high photographing magnifications. Furthermore, since the calculation for gravitation correction for the acceleration sensors 11p, 11y is performed based on rotational shake correction values obtained by calculation on the outputs of the angular velocity sensors 86p, 86y, the detection of shift shake is made possible with a simple configuration. Still further, since the initial postures of the acceleration sensors 11p, 11y are determined in synchronization with a preparatory operation for shooting, such as an operation for starting focusing or completion of focusing, and the influence of gravity is corrected based on the initial postures, shift shake can be detected reliably every time preparation for shooting is performed.

The above description of the first to third embodiments has been directed to countermeasures against shift shake in the case of image stabilizing system of a camera (image pickup apparatus). However, the apparatus according to the present invention is not limited to these kinds of cameras, since it can be implemented in a small-size highly-stable mechanism. The present invention can be implemented in, for example, a digital video camera, a surveillance camera, a web camera and a cellular telephone.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-372267, filed Dec. 26, 2005, which is hereby incorporated by reference herein in its entirety.

What is claimed is:

1. An image stabilizing apparatus comprising:
an angular velocity detector that detects an angular velocity of said image stabilizing apparatus generated by shaking of said image stabilizing apparatus;
an acceleration detector that detects acceleration of said image stabilizing apparatus generated by the shaking;
an angular velocity integrator that calculates a shake angle by integrating an output of said angular velocity detector;
a gravity influence calculator that calculates a change in the influence of gravity on the acceleration detector based on an output of said angular velocity integrator;
an acceleration corrector that corrects an output of said acceleration detector based on an output of said gravitation influence calculator;
an acceleration integrator that integrates an output of said acceleration corrector; and
a blur corrector that corrects image blur by decentering an optical axis based on an output of said acceleration integrator and an output of said angular velocity integrator.

2. An image stabilizing apparatus according to claim 1, further comprising an initial posture direction detector that detects an initial posture direction of said acceleration detector based on an output of the acceleration detector, wherein the calculation process in said gravity influence calculator is changed based on an output of said initial posture direction detector, and an output of said acceleration detector or said acceleration integrator is corrected based on an output of said gravity influence calculator.

3. An image stabilizing apparatus according to claim 2, wherein said initial posture direction detector detects the initial posture direction of said acceleration detector in synchronization with a preparatory operation for photographing.

4. An image pickup apparatus provided with an image stabilizing apparatus according to claim 1.

5. An image stabilizing apparatus, comprising:
an angular velocity detector that detects an angular velocity of said image stabilizing apparatus generated by shaking of said image stabilizing apparatus;
an acceleration detector that detects acceleration of said image stabilizing apparatus generated by the shaking;
an angular velocity integrator that calculates a shake angle by integrating an output of said angular velocity detector;
an acceleration integrator that integrates an acceleration output detected by said acceleration detector;
a gravity influence calculator that calculates a change in the influence of gravity on the acceleration detector based on an output of said angular velocity integrator;
an acceleration corrector that corrects an output of said acceleration integrator based on an output of said gravitation influence calculator; and
a blur corrector that corrects image blur by decentering an optical axis based on an output of said acceleration corrector and an output of said angular velocity integrator.

6. An image stabilizing apparatus according to claim 5, further comprising an initial posture direction detector that detects an initial posture direction of said acceleration detector based on an output of that acceleration detector, wherein a calculation process in said gravity influence calculator is changed based on an output of said initial posture direction detector, and an output of said acceleration detector or said acceleration integrator is corrected based on an output of said gravity influence calculator.

7. An image stabilizing apparatus according to claim 6, wherein said initial posture direction detector detects the initial posture direction of said acceleration detector in synchronization with a preparatory operation for photographing.

8. An image pickup apparatus provided with an image stabilizing apparatus according to claim 5.

* * * * *